(12) United States Patent
Buthker

(10) Patent No.: US 10,333,402 B2
(45) Date of Patent: Jun. 25, 2019

(54) APPARATUS COMPRISING MULTIPLE POWER CONVERTERS WITH REAL OR ARTIFICAL HYSTERESIS

(71) Applicant: NXP B.V., Eindhoven (NL)

(72) Inventor: Henricus Cornelis Johannes Buthker, Mierlo (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/045,452

(22) Filed: Jul. 25, 2018

(65) Prior Publication Data

US 2019/0140538 A1    May 9, 2019

(30) Foreign Application Priority Data

Oct. 4, 2017   (EP) ..................... 17194695

(51) Int. Cl.
*H05B 33/08*   (2006.01)
*H02M 3/157*   (2006.01)

(52) U.S. Cl.
CPC ........ *H02M 3/157* (2013.01); *H05B 33/0815* (2013.01)

(58) Field of Classification Search
None
See application file for complete search history.

(56) References Cited

U.S. PATENT DOCUMENTS

| | | |
|---|---|---|
| 5,892,352 A | 4/1999 | Kolar et al. |
| 6,271,650 B1 | 8/2001 | Massie et al. |
| 6,628,106 B1 | 9/2003 | Batarseh et al. |
| 6,801,026 B2 | 10/2004 | Schrom et al. |
| 2007/0262724 A1 | 11/2007 | Mednik et al. |
| 2013/0015829 A1 | 1/2013 | Menegoli et al. |
| 2015/0236595 A1* | 8/2015 | Babazadeh ......... H02M 3/1584 323/272 |
| 2015/0277460 A1* | 10/2015 | Liu ..................... H03L 7/06 323/280 |

OTHER PUBLICATIONS

Tsolaridis et al., "Interleaved hybrid control concept for multiphase DC-DC converters", 2017 IEEE Energy Conversion Congress and Exposition (ECCE), Oct. 1, 2017, pp. 3069-3076.
Li et al., "A Delay-Locked Loop Synchronization Scheme for High-Frequency Multiphase Hysteretic DC-DC Converters", IEEE Journal of Solid-State Circuits, Nov. 1, 2009; vol. 44, No. 11, pp. 3131-3145.

* cited by examiner

*Primary Examiner* — Jany Richardson

(57) ABSTRACT

An apparatus is described, comprising: a first power converter with real or artificial hysteresis; a second power converter with real or artificial hysteresis; and a control circuit configured to output a control signal dependent on a phase difference or frequency difference between the first and second power converters; wherein the apparatus is configured such that a magnitude of hysteresis of at least one of said first and second power converters is controlled by said control signal.

15 Claims, 7 Drawing Sheets

APPARATUS COMPRISING MULTIPLE POWER CONVERTERS WITH REAL OR ARTIFICAL HYSTERESIS

FIELD OF THE INVENTION

The present invention relates to an apparatus comprising multiple power converters with real or artificial hysteresis, in particular, but not exclusively, to an apparatus comprising multiple hysteretic power converters controlled to operate at the same frequency with a predetermined phase difference, and to multiple hysteretic power converters operating in multiphase configurations.

BACKGROUND OF THE INVENTION

It can be advantageous to operate two buck converters in multi-phase configuration. When run at the same frequency and with opposite phase, the resulting output current ripple is significantly reduced. The input current ripple may also be significantly reduced.

Hysteretic power converters are widely used for Solid State Lighting (SSL) applications, for example in cars. Many SSL applications require a low current ripple. However, hysteretic converters have no defined frequency and therefore are not used in multi-phase configurations. Instead, large filter capacitors are used to achieve a low ripple current. In LED matrix applications, the output voltage changes frequently with the number of shorted LEDs, causing the switching frequency of the hysteretic converter to vary frequently and over a wide range. This makes filtering more complicated and expensive.

Throughout this disclosure, the term 'hysteretic power converter' includes both power converters with real hysteresis and power converters with artificial hysteresis. An example of a hysteretic power converter with artificial hysteresis is the median converter which used controlled time delays to emulate hysteresis.

SUMMARY OF THE INVENTION

Aspects of the invention are set out in the accompanying claims. Combinations of features from the dependent claims may be combined with features of the independent claims as appropriate and not merely as explicitly set out in the claims.

According to an aspect of the invention, there is provided an apparatus comprising:

a first power converter with real or artificial hysteresis;
a second power converter with real or artificial hysteresis; and
a control circuit configured to output a control signal dependent on a phase difference or frequency difference between the first and second power converters;
wherein the apparatus is configured such that a magnitude of hysteresis of at least one of said first and second power converters is controlled by said control signal.

By controlling the magnitude of the hysteresis of at least one of said first and second power converters using said control signal, wherein the control signal is dependent on a phase or frequency difference between the first and second power converters, the frequency and phase of one or both of the power converters may be controlled so that the first and second power converters operate at the same frequency and with a desired phase difference. This enables multiple power converters with real or artificial hysteresis to be operated in multiphase configurations. Multi-phase operation provides many benefits, including a reduction in reducing current ripple.

In some embodiments, at least one of said first/second power converters comprises a first/second current comparator with hysteresis, configured to generate a first/second current comparator output signal based on a comparison of a current flowing in a first/second inductive element of the first/second power converter and upper and lower first/second reference current levels.

The magnitude of hysteresis of at least one of said first and second power converters is controlled by adjusting said upper and/or lower first/second reference current levels based on said control signal.

By adjusting the upper and/or lower first/second reference current levels based on the control signal, the on-time and off-time of the first/second power converter may be adjusted, thereby adjusting the frequency of the first/second power converter.

In some embodiments, at least one of said first/second power converters comprises a median power converter comprising a first/second current comparator with no hysteresis, configured to generate a first/second current comparator output signal based on a comparison of a current flowing in a first/second inductive element of the first/second power converter and a first/second reference current level.

A feature of the median power converter is that the current comparator output signal may have a 50% duty cycle.

The magnitude of hysteresis of at least one of said first and second power converters is controlled by adjusting at least one time delay for delaying switching of the first/second power converter relative to the first/second current comparator output signal based on said control signal.

By adjusting the time delay(s) for delaying switching of the first/second power converter relative to the first/second current comparator output signal based on said control signal, the on-time and/or off-time of the first/second power converter may be adjusted, thereby adjusting the frequency of the first/second power converter.

In some embodiments of the apparatus:

said first power converter comprises a first current comparator configured to generate a first current comparator output signal based on a comparison of a current flowing in a first inductive element of the first power converter and at least one first reference current level;
said second power converter comprises a second current comparator configured to generate a second current comparator output signal based on a comparison of a current flowing in a second inductive element of the second power converter and at least one second reference current level; and
said control circuit is configured to output said control signal dependent on a phase difference or frequency difference between the first current comparator output signal and the second current comparator output signal.

Advantageously, the current comparator output signals may be square waves, which facilitates detection of a phase/frequency difference between the first and second power converters using phase detection techniques based on edge detection.

The apparatus may be configured to operate in steady state when the first and second power converters are operating at the same frequency.

The apparatus may be configured to operate in steady state when the first and second power converters are operating at the same frequency and opposite phase.

This is beneficial when operating two power converters together to reduce output current ripple.

The apparatus may be configured to operate in steady state when the first and second power converters are operating at the same frequency and 90 degree relative phase shift.

This is particularly beneficial when operating four power converters together to reduce output current ripple.

The apparatus may further comprise:
a third power converter with real or artificial hysteresis;
a fourth power converter with real or artificial hysteresis:
a second control circuit configured to output a second control signal dependent on a phase difference or frequency difference between the second and third power converters, wherein the hysteresis of at least one of said second and third power converters is controlled by said second control signal; and
a third control circuit configured to output a third control signal dependent on a phase difference or frequency difference between the third and fourth power converters, wherein the hysteresis of at least one of said third and fourth power converters is controlled by said third control signal.

The control circuit may comprise a phase/frequency detector based on dual D-flip-flops.

The control circuit may comprise a phase/frequency detector based on an SR flip-flop.

This type of phase/frequency detector is suitable for use with power converters with real or artificial hysteresis.

The control circuit may comprise a phase/frequency detector based on an XOR-gate for determination of said phase/frequency difference.

The control circuit may comprise a filter comprising a capacitor, wherein said control circuit further comprises first and second switched current sources arranged to charge and discharge the capacitor respectively.

The control signal may correspond to a voltage across said filter.

The apparatus may further comprise a power output coupled to said first and second power converters.

By combining power output from multiple power converters, a power output with reduced current and/or voltage ripple may be obtained.

According to another aspect of the invention, there is provided a power supply for an LED array, comprising an apparatus according to the first aspect of the invention.

BRIEF DESCRIPTION OF THE DRAWINGS

Embodiments of the present invention will be described, by way of example only, with reference to the accompanying drawings in which like reference signs relate to like elements and in which.

DETAILED DESCRIPTION

Figure 1:
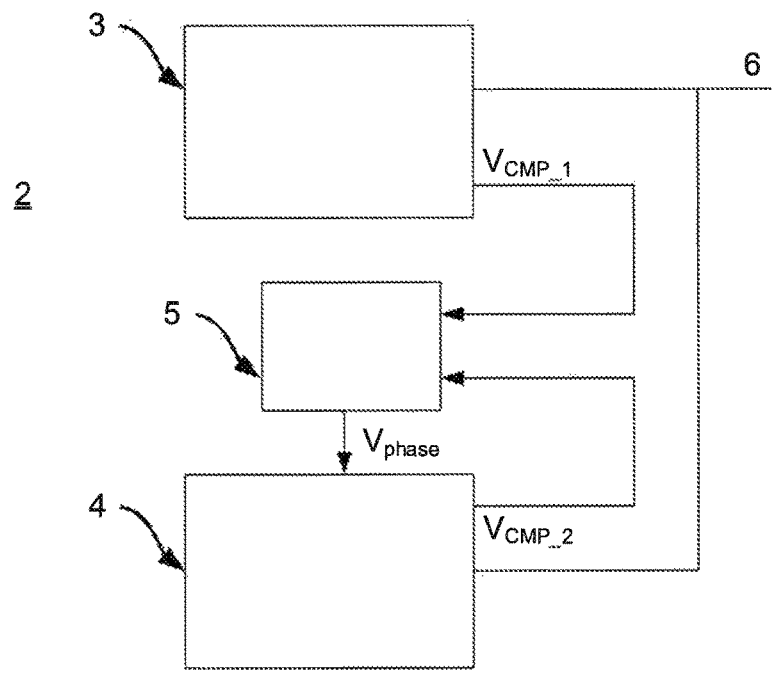
FIG. 1 illustrates an apparatus according to an embodiment of the invention.

With reference to FIG. 1, an apparatus 2 according to an embodiment of the present invention includes a first hysteretic power converter 3, a second hysteretic power converter 4, and a control circuit 5. The control circuit 5 is configured to output a control signal $V_{phase}$ dependent on a phase difference or frequency difference between the first and second power converters 3, 4. The magnitude of hysteresis of the second hysteretic power converter 4 is controlled by the control signal $V_{phase}$. As a result, the first and second hysteretic power converters 3, 4 may run at the same frequency and with a predetermined phase difference.

In this embodiment, the first power converter 3 includes a first current comparator (not shown) configured to generate a first current comparator output signal $V_{CMP\_1}$ based on a comparison of a current flowing in a first inductive element (not shown) of the first power converter 3 and at least one first reference current level. Similarly, the second power converter 4 includes a second current comparator (not shown) configured to generate a second current comparator output signal $V_{CMP\_2}$ based on a comparison of a current flowing in a second inductive element (not shown) of the second power converter 4 and at least one second reference current level. The control signal $V_{phase}$ output by the control circuit 5 is dependent on a phase difference or frequency difference between the first and second current comparator output signals $V_{CMP\_1}$ and $V_{CMP\_2}$.

Figure 5:
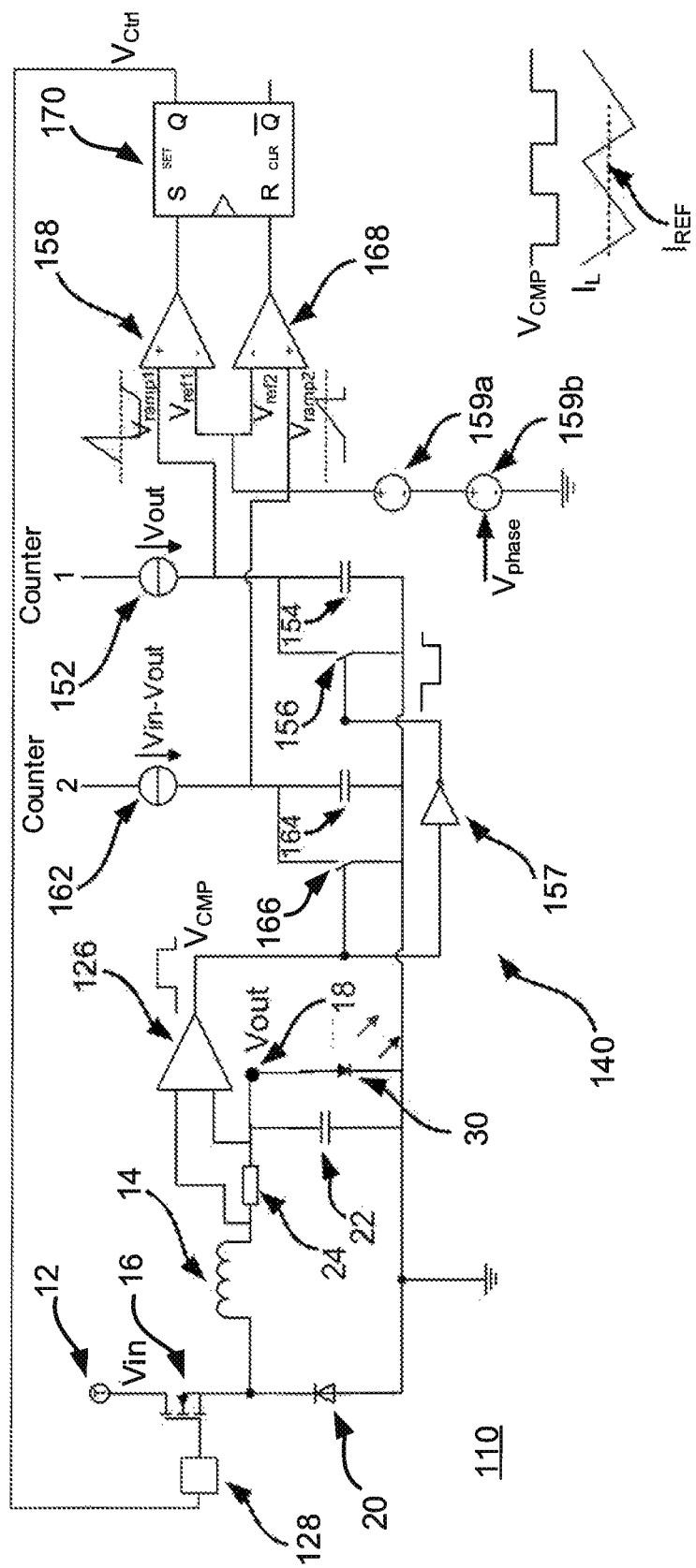
FIG. 5 illustrates another embodiment of the first/second hysteretic power converter 3, 4 of FIG. 1, in the form of a median converter with adjustable artificial hysteresis.
Figure 10:
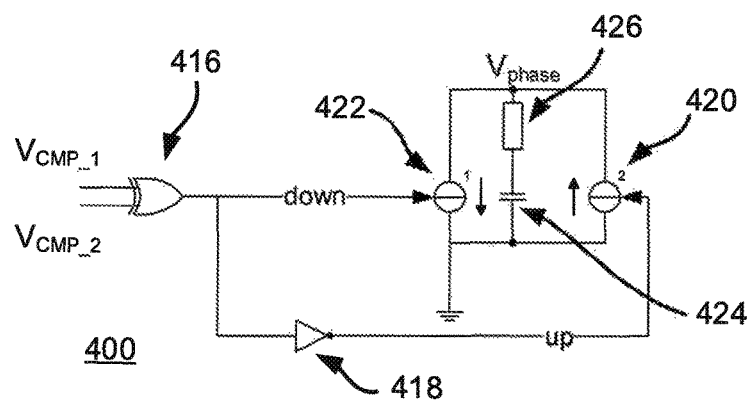
FIG. 10 illustrates another embodiment of the control circuit 5 of FIG. 1, incorporating an XOR gate.

The first and second power converters 3, 4, may be implemented by various different configurations of hysteretic power converters, including a hysteretic buck converter 10 with real hysteresis (FIG. 2) and a hysteretic converter with artificial hysteresis, also known as a median converter 110 (FIG. 5). The control circuit 5 includes a phase/frequency detector and may be based on various different types of phase detector including phased detectors based on edge-triggered SR-based flip-flop (FIG. 3), dual D-flip-flop (FIG. 8) and XOR (FIG. 10). However, the skilled person will appreciate that the invention may be applicable to other types of hysteretic power converter, and to control circuits operating on different principles, in addition to the hysteretic power converters and control circuits described herein.

Figure 2:
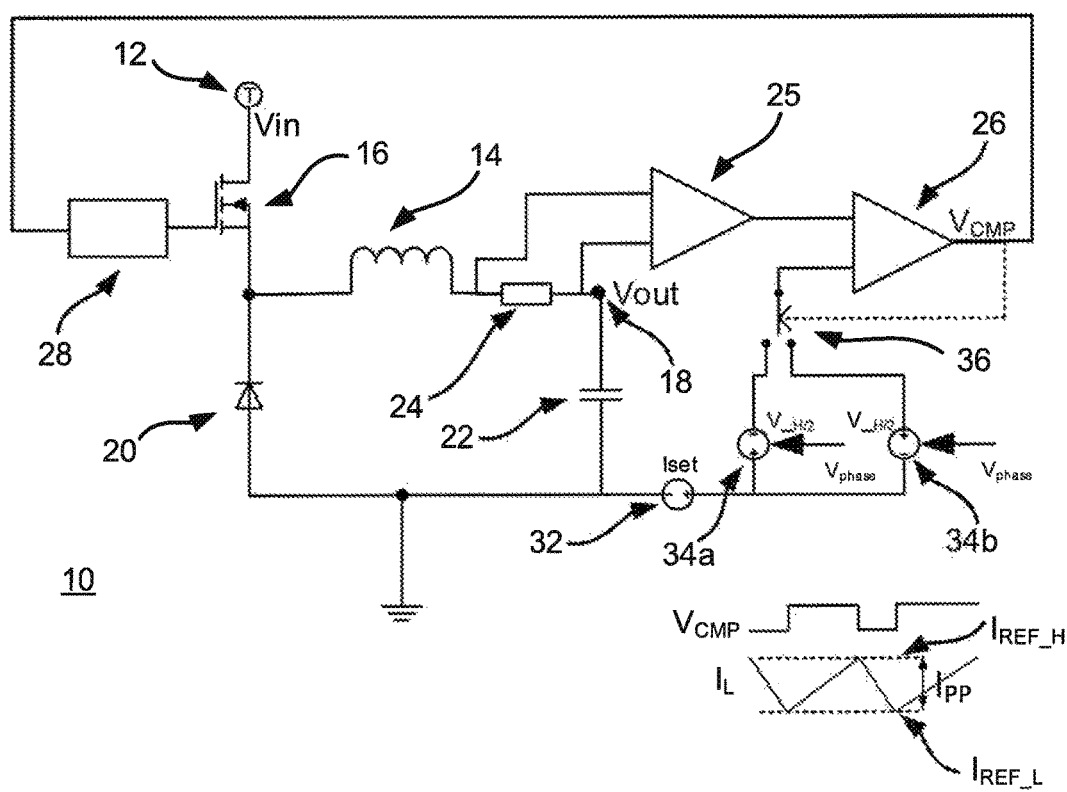
FIG. 2 illustrates an embodiment of the first/second hysteretic power converter 3, 4 of FIG. 1, in the form of a hysteretic buck converter with adjustable real hysteresis.

FIG. 2 illustrates a hysteretic buck converter 10 with real hysteresis, suitable for use as one or both of the first and second hysteretic power converters 3, 4 of FIG. 1. The hysteretic converter 10 includes a power source 12 providing an input voltage $V_{in}$, selectively connected to an inductive element 14 in the form of an inductor, by a switching element 16 in the form of a MOSFET. A power output 18 is coupled to the inductor 14 for providing an output voltage $V_{out}$ to a load (not shown). A diode 20 is connected in parallel with the power source 12 and switching element 16. A capacitor 22 is connected in parallel with the power output 18 to filter the output voltage $V_{out}$. A resistor 24 is provided in series with the inductor 14 for sensing the current through the inductor 14. A current sense amplifier 25 has inputs connected to each side of the sense resistor 24 and outputs a sensed inductor current signal representing the current in the resistor 24 and inductor 14. A current comparator 26 with hysteresis is configured to generate a current comparator output signal $V_{CMP}$ based on a comparison of the sensed inductor current with upper and lower reference values $I_{REF\_H}$, $I_{REF\_L}$ set by the current comparator 26. The current comparator output signal $V_{CMP}$ controls the switching element 16 via a gate drive 28.

When the switching element 16 is on, the current $I_L$ through the inductor 14 rises at a rate $(V_{in}-V_{out})/L$, where L is the inductance of the inductor 14, until it reaches the upper reference value $I_{REF\_H}$ of the current comparator 26. The control signal $V_{CMP}$ output by the current comparator 26 then transitions to low, and the switching element 16 is commanded to switch off via the gate drive 28. When the switching element 16 is off, the inductor current $I_L$ falls at a rate $V_{out}/L$ until it reaches the lower reference value $I_{REF\_L}$ of the current comparator 26. The control signal $V_{CMP}$ output by the current comparator 26 then transitions to high, causing the switching element 16 to switch on. The on-time $T_{on}$ (and thus the duration of the rising slope of the current) and off-time $T_{off}$ (and thus the duration of the falling slope of the current) of the power converter 10 are given by:

$$T_{on}=L\cdot I_{pp}/(V_{in}-V_{out})$$

and $$T_{off}=L\cdot I_{pp}/(V_{out}),$$

wherein $I_{pp}$ is the peak-to-peak inductor current ripple.

Hysteretic converters have no defined switching frequency. The switching frequency f of the hysteretic converter 10 is variable and depends on the magnitude of the hysteresis $I_{pp}$, the input voltage $V_{in}$, the output voltage $V_{out}$ and the inductor value L according to the following relationship:

$$f = 1/(T_{on} + T_{off})$$
$$= (1/(L\cdot I_{pp}))\cdot ((V_{in} - V_{out})\cdot V_{out}/V_{in}).$$

The current ripple $I_{pp}$ of the hysteretic converter 10 with real hysteresis depends on the magnitude of the hysteresis of the current comparator 26, i.e. on the difference between the upper and lower reference current levels, $I_{REF\_H}$ and $I_{REF\_L}$ and is typically fixed.

The present invention exploits the realisation that the switching frequency may be influenced by changing the hysteresis $I_{pp}$. A larger hysteresis $I_{pp}$ results in a lower frequency f. In the present embodiment shown in FIG. 1, the magnitude of hysteresis of the second hysteretic power converter 4 is controlled by adjusting the upper and lower reference current levels $I_{REF\_H}$ and $I_{REF\_L}$ based on the control signal $V_{phase}$ output by the control circuit 5, and therefore does not have a fixed hysteresis or current ripple.

In the hysteretic buck converter 10 shown in FIG. 2, the hysteresis of the current comparator 26 is controlled via voltage sources 32, 34a and 34b, and switch 36. The switch 36 is controlled by the current comparator output signal $V_{CMP}$ to alternately connect the reference level input of the current comparator 26 to either one of the voltage sources 34a or 34b. The voltage sources 34a and 34b are each connected in series to voltage source 32, in opposite senses. Voltage source 32 outputs a voltage $I_{set}$ which determines the mean current level, i.e. $(I_{REF\_H}+I_{REF\_L})/2$. Voltage sources 34a and 34b are each controlled by the control signal $V_{phase}$ from the control circuit 5 to output a voltage $+/-V_{\_H}/2$, where $V_{\_H}$ is adjusted from a fixed value by an amount proportional to $V_{phase}$. The upper and lower reference levels of the voltage comparator 26 are therefore equal to $I_{set}+/-V_{\_H}/2$. The hysteresis of the current comparator 26 is set by $V_{\_H}$, and is adjusted dependent on $V_{phase}$.

When the first and second hysteretic converters 3, 4 of FIG. 1 are implemented using the hysteretic buck converter 10 of FIG. 2, it is only necessary to control the hysteresis of one of the hysteretic power converters. In the embodiment shown in FIG. 1, this is the second hysteretic converter 4. The first hysteretic power converter 3 may therefore have fixed hysteresis, and the voltage sources 34a, 34b may have fixed outputs.

Figure 3:
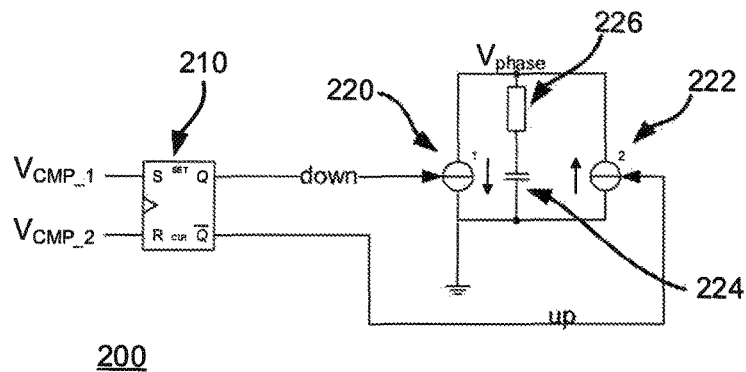
FIG. 3 illustrates an embodiment of the control circuit 5 of FIG. 1, incorporating an edge-triggered SR-based flip-flop.

FIG. 3 illustrates a control circuit 200 based on phase detection by an edge-triggered SR-based flip-flop. This control circuit 200 is suitable for use as the control circuit 5 of FIG. 1, when using the hysteretic buck converter 10 with real hysteresis, shown in FIG. 2, for each of the hysteretic power converters 3, 4 of FIG. 1.

The control circuit 200 includes an SR flip-flop 210 which receives, at its S and R inputs respectively, the first and second current comparator output signals $V_{CMP\_1}$ and $V_{CMP\_2}$ from the first and second power converters 3, 4 respectively. The Q and $\overline{Q}$ outputs of the SR flip-flop 210 each drives a respective switched current source 220, 222. The current sources 220, 222 are connected in parallel in opposite senses, such that the Q output of the SR flip-flop 210 drives the 'down' current source 220, while the $\overline{Q}$ output of the SR flip-flop 210 drives the 'up' current source 222. A filter, comprising a capacitor 224 and a resistor 226, is connected in parallel with the current sources 220, 222. The current sources 220, 222, respectively charge and discharge the capacitor 224 dependent on a phase difference between the first and second current comparator output signals $V_{CMP\_1}$ and $V_{CMP\_2}$. A control voltage $V_{phase}$ is developed across the series-connected capacitor 224 and resistor 226, and is output for controlling the hysteresis of the second hysteretic power converter 4. The control voltage $V_{phase}$ is used to adjust the hysteresis of the current comparator 26 (i.e. the difference between the upper and lower reference current levels, $I_{REF\_H}$ and $I_{REF\_L}$) of the second hysteretic power converter 4 as described above. For this control circuit 200, the control voltage $V_{phase}$ is minimised when the first and second current comparator output signals $V_{CMP\_1}$ and $V_{CMP\_2}$ have the same frequency and opposite phase.

Figure 4:
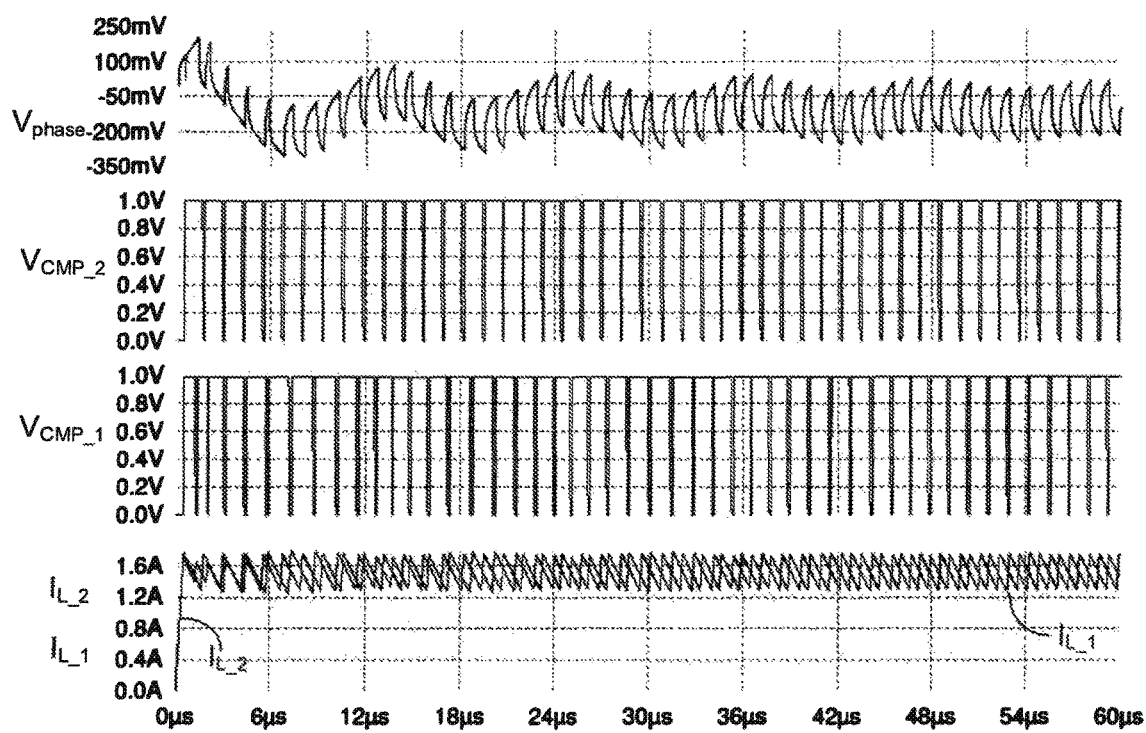
FIG. 4 shows results of simulation of the apparatus of FIG. 1, implemented using two hysteretic buck converters (FIG. 2) and the SR flip-flop-based control circuit of FIG. 3.

FIG. 4 shows the results of a simulation of an embodiment of the apparatus 2 of FIG. 1, in which the hysteretic power converters 3, 4, are each implemented by a hysteretic buck converter 10 with real hysteresis (FIG. 2), and in which the control circuit 5 is implemented by the control circuit 200 (FIG. 3) based on an edge-triggered SR-type flip-flop. The voltage $V_{phase}$ corresponds to the voltage across the capacitor 224 and resistor 226 of the control circuit 200. The voltages $V_{CMP\_1}$ and $V_{CMP\_2}$ correspond to the current comparator output signals of the first and second hysteretic power converters 3, 4, respectively. The currents $I_{L\_1}$ and $I_{L\_2}$ correspond to the inductor currents of the first and second hysteretic power converters 3, 4, respectively. It can be seen that, within a few cycles of operation, the first and second power converters 3, 4, are operating in steady state with opposite phases and equal frequencies. This is achieved for all duty-cycles.

The invention may also be implemented using a variant of the hysteretic converter with artificial hysteresis, also called a median converter because the median of the current is kept constant. This converter uses two counters or sawtooth generators to emulate the ripple current. A benefit of the median converter is its lower sensitivity to delays in the power stage.

FIG. 5 shows a median converter 110 suitable for use as one or both of the first and second hysteretic power converters 3, 4 of FIG. 1. A power source 12 providing an input voltage $V_{in}$ is selectively connected to an inductor 14 by a switching element 16 in the form of a MOSFET. A power output 18 is coupled to the inductor 14 for providing an output voltage $V_{out}$ to a load 30 in the form of an LED. A diode 20 is connected in parallel with the power source 12 and switching element 16. In other embodiments (not shown), the diode 20 may be replaced by a further switching element. A capacitor 22 is connected in parallel with the power output 18 to filter the output voltage $V_{out}$. A resistor 24 is provided in series with the inductor 14 for sensing the current through the inductor 14. A current comparator 126 with no hysteresis is configured to generate a current comparator output signal $V_{CMP}$ based on a comparison of the sensed inductor current $I_L$ with a reference value $I_{REF}$. A control circuit 140 receives the current comparator output signal $V_{CMP}$ and generates a control signal $V_{Ctrl}$ for controlling the switching element 16 via a gate drive 128.

In the median converter 110, the current comparator 126 has no hysteresis. A key characteristic of the median converter is that the output of the current comparator has a 50% duty cycle in steady state. This makes the median converter 110 suitable for use with a wide range of phase detectors. Assuming the inductor current $I_L$ increases and decreases linearly with time, the current comparator 126 of the median converter 110 toggles at the average current, which is exactly halfway up each slope. When operating in steady state with the average inductor current at a value corresponding to the setpoint or reference current level $I_{REF}$ of the current comparator 126, the current comparator output signal $V_{CMP}$ will have a 50% duty-cycle.

Figure 6:
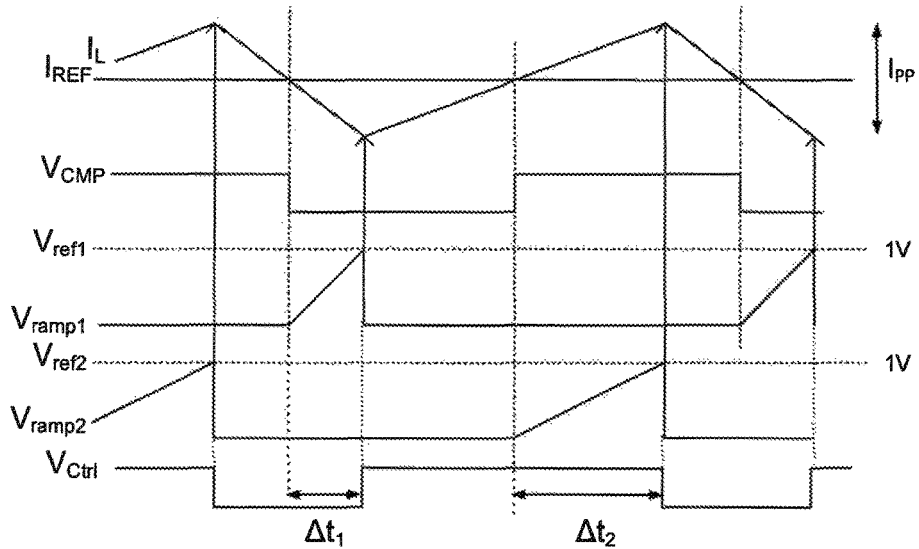
FIG. 6 illustrates the variation with time of control voltage $V_{Ctrl}$, inductor current $I_L$, current comparator output signal $V_{CMP}$, and first and second voltage ramps $V_{ramp1}$ and $V_{ramp2}$ in the median converter of FIG. 5.

The control circuit 140 generates a control signal $V_{Ctrl}$ suitable for controlling the switching element 16 via the gate drive 128 at the correct timing, i.e. at times at which the inductor current reaches the desired maximum and minimum values, based on the current comparator output signal $V_{CMP}$ and first and second time delays $\Delta t_1$ and $\Delta t_2$. As shown in FIG. 6, the transitions of the control signal $V_{Ctrl}$ used for switching the switching element 16 on and off are delayed relative to the transitions of the current comparator output signal $V_{CMP}$ by the first and second time delays $\Delta t_1$ and $\Delta t_2$ respectively. The control circuit 140 generates the first and second time delays $\Delta t_1$ and $\Delta t_2$ using sawtooth generators.

To emulate a fixed current ripple $I_{pp}$, the control circuit is configured to generate a first time delay $\Delta t_1$ proportional to $T_{off}=L\cdot I_{pp}/(V_{out})$ and a second time delay $\Delta t_2$ proportional to $T_{on}=L\cdot I_{pp}/(V_{in}-V_{out})$ respectively, where $I_{pp}$ is the required fixed current ripple.

With reference to FIGS. 5 and 6, the first time delay $\Delta t_1$, proportional to $1/V_{out}$, is generated by comparing a voltage ramp $V_{ramp1}$ having slope $V_{out}$ and a reference voltage $V_{ref1}$ set at a fixed value, for example 1V. A current source 152, providing a current proportional to $V_{out}$, is connected to a capacitor 154, which is selectively shorted to ground by a switch 156. The switch 156 is controlled by a signal output from an inverter 157 which inverts the output signal $V_{CMP}$ from the current comparator 126. During the off time of the switching element 16, the output voltage $V_{CMP}$ of the current comparator 126 transitions to low when the inductor current $I_L$ decreases below the reference value $I_{REF}$, and the output of the inverter 157 correspondingly transitions high, causing switch 156 to open and the capacitor 154 to start charging from the current source 152. The voltage $V_{ramp1}$ across the capacitor 154 increases at a rate proportional to the current output by current source 152, i.e. at a rate proportional to $V_{out}$. A first voltage comparator 158 compares $V_{ramp1}$ with the fixed reference voltage $V_{ref1}$ and its output transitions high when $V_{ramp1}$ increases above $V_{ref1}$. This occurs at a time a proportional to $1/V_{out}$, after the output $V_{CMP}$ of the current comparator 126 transitions to low.

The second time delay $\Delta t_2$, proportional to $1/(V_{in}-V_{out})$, is generated by comparing a voltage ramp $V_{ramp2}$ having slope $V_{in}-V_{out}$ and a reference voltage $V_{ref2}$ set at a fixed value, for example 1V. A current source 162, providing a current proportional to $V_{in}-V_{out}$, is connected to a capacitor 164, which is selectively shorted to ground by a switch 166. The switch 166 is controlled by the output signal $V_{CMP}$ from the current comparator 126. During the on time of the switching element 16, the output voltage $V_{CMP}$ of the current comparator 126 transitions to high when the inductor current $I_L$ increase above the reference value $I_{REF}$, causing switch 166 to open and the capacitor 164 to start charging from the current source 162. The voltage $V_{ramp2}$ across the capacitor 164 increases at a rate proportional to the current output by current source 162, i.e. at a rate proportional to $V_{in}-V_{out}$. A second voltage comparator 168 compares $V_{ramp2}$ with the fixed reference voltage $V_{ref2}$ and its output transitions high when $V_{ramp2}$ increases above $V_{ref2}$. This occurs at a time $\Delta t_2$, proportional to $1/(V_{in}-V_{out})$, after the output $V_{CMP}$ of the current comparator 126 transitions to high.

The current sources 152, 162, proportional to $V_{out}$ and $V_{in}-V_{out}$ respectively, may be implemented in various ways, including using a simple resistor, current mirrors, or cascoded mirrors, with or without offset compensation. Although the control circuit 140 of the present embodiment is analog, it is also possible to implement a median converter using digital blocks. The sawtooth generators are then replaced by counters with variable increment. Input and output voltages can be measured with ADCs.

The outputs of the first and second voltage comparators 158, 168 are connected to the set and reset inputs respectively of a latch 170. The output $V_{Ctrl}$ of the latch 170 is used to control the switching element 16 via gate drive 128. Since the slope of each analog delay sawtooth ramp $V_{ramp1}$ and $V_{ramp2}$ is related to the input and output voltages $V_{in}$ and $V_{out}$ in the same way as the inductor ripple current, the use of constant reference voltages $V_{ref1}$ and $V_{ref2}$ results in a fixed current ripple $I_{pp}$ or artificial hysteresis, as can be seen in FIG. 6.

The current ripple $I_{pp}$ of the median converter 110 with artificial hysteresis depends on the magnitude of the first and second time delays $\Delta t_1$ and $\Delta t_2$. Therefore the switching frequency of the median converter 110 may be influenced by changing the magnitude of the (artificial) hysteresis of the power converter 110 by adjusting the first and/or second time delays $\Delta t_1$ and $\Delta t_2$. A larger ripple current $I_{pp}$ is achieved by increasing one or both time delays $\Delta t_1$, $\Delta t_2$, resulting in a lower frequency f. In the present embodiment shown in FIG. 1, the current ripple $I_{pp}$ of the second hysteretic power converter 4 is controlled by the control signal $V_{phase}$ output by the control circuit 5. As a result, the current ripple $I_{pp}$ of the second hysteretic power converter 4 is not fixed.

With reference to FIG. 5, the (artificial) hysteresis of the median converter 110 may be controlled via series-connected voltage sources 159a and 159b, which provide the reference voltages $V_{ref1}$ and $V_{ref2}$ for the voltage comparators 158 and 168. Voltage source 159a may be used to generate a fixed voltage, for example 1V as used in the example described with reference to FIG. 6. Voltage source 159b is controlled by the control signal $V_{phase}$ from the control circuit 5 to output a voltage proportional to $V_{phase}$. As a result, when there is a phase difference between the two hysteretic converters 3, 4, the second voltage source 159b increases the reference voltages $V_{ref1}$ and $V_{ref2}$ input to the voltage comparators 158 and 168 and increases the first and second time delays $\Delta t_1$ and $\Delta t_2$ accordingly.

When the first and second hysteretic converters 3, 4 of FIG. 1 are implemented using the median converter 10 of FIG. 5, it is only necessary to control the hysteresis of one of the hysteretic power converters. In the embodiment shown in FIG. 1, this is the second hysteretic converter 4. The first hysteretic power converter 3 may therefore have fixed hysteresis, and the reference voltages $V_{ref1}$ and $V_{ref2}$ input to the voltage comparators 158 and 168 in FIG. 5 may have fixed values.

Figure 7:
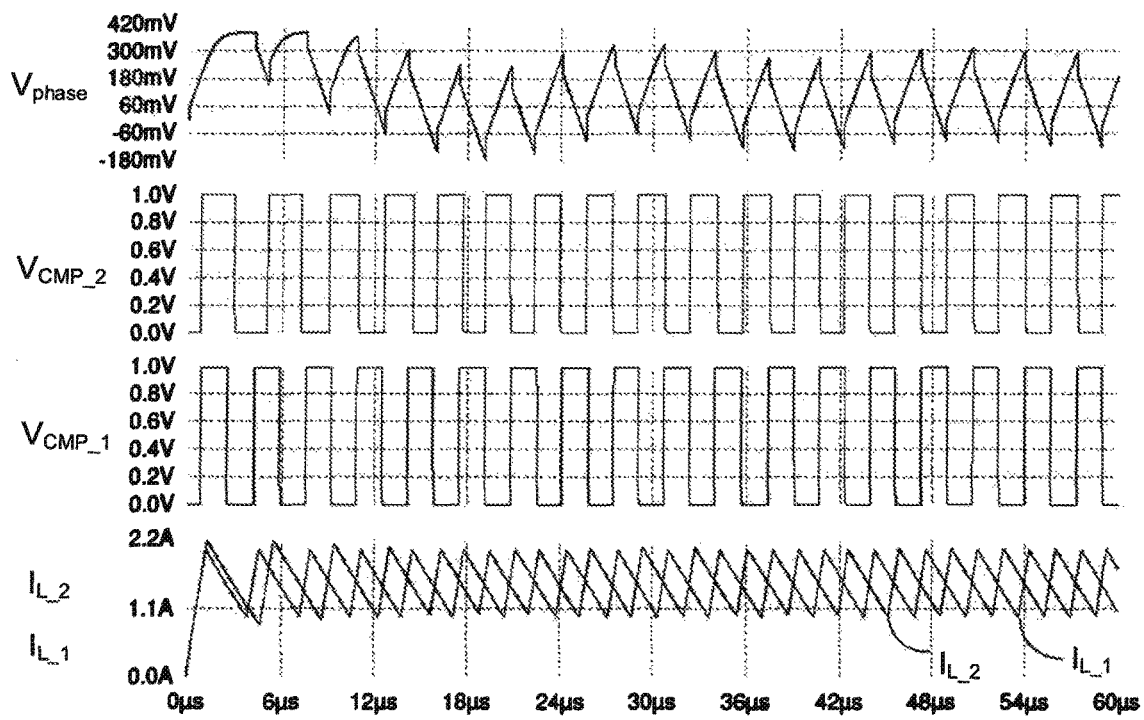
FIG. 7 shows results of simulation of the apparatus of FIG. 1, implemented using two median power converters with artificial hysteresis (FIG. 5) and the SR flip-flop-based control circuit of FIG. 3.

FIG. 7 shows the results of a simulation of an embodiment of the apparatus 2 of FIG. 1, in which the hysteretic power converters 3, 4, are each implemented by a median power converter 110 (FIG. 5), and in which the control circuit 5 is implemented by the control circuit 200 (FIG. 3) based on an edge-triggered SR-type flip-flop. It can be seen that, within a few cycles of operation, the first and second power converters 3, 4, have opposite phases and equal frequencies. This is achieved for all duty-cycles.

Figure 8:
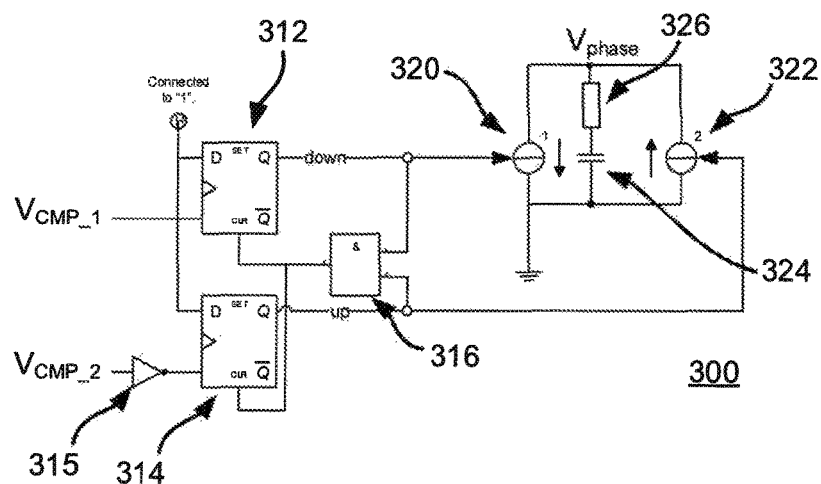
FIG. 8 illustrates another embodiment of the control circuit 5 of FIG. 1, incorporating a dual D-flip-flop.

FIG. 8 illustrates a control circuit 300 based on phase detection by a dual D-flip-flop. This control circuit 200 is suitable for use as the control circuit 5 of FIG. 1, when using the median converter 110 of FIG. 5 for each of the hysteretic power converters 3, 4 of FIG. 1. In the case of a hysteretic converter 10 with real hysteresis as shown in FIG. 2, the dual D-flip-flop based phase detector does not work because it needs a duty-cycle of 50% at the inputs.

The control circuit 300 includes two D-flip-flops 312 and 314 and an AND gate 316. The first D-flip-flop 312 receives the first current comparator output signal $V_{CMP\_1}$ from the first power converter 3, while the second D-flip-flop 314 receives the second current comparator output signal $V_{CMP\_2}$ from the second power converter 4, which is pre-inverted by inverter 315. The AND gate 316 receives the Q outputs of the two D-flip-flops 312 and 314 at its inputs, and its output is connected to the CLR inputs of both D-flip-flops 312 and 314. The Q output of the first and second D-flip-flops 312, 314 each drives a respective switched current source 320, 322. The current sources 320, 322 are connected in parallel in opposite senses, such that the Q output of the first D-flip-flop 312 drives the 'down' current source 320, while the Q output of the second D-flip-flop 314 drives the 'up' current source 322. A filter is connected in parallel with the current sources 320, 322 and comprises a capacitor 324 and a resistor 326. A control voltage $V_{phase}$ is developed across the capacitor 324 and resistor 326, which is used to control the hysteresis of the second hysteretic power converter 4. Inversion of the second current comparator output signal $V_{CMP\_2}$ by the inverter 315 ensures that the control voltage $V_{phase}$ is minimised when the first and second current comparator output signals $V_{CMP\_1}$ and $V_{CMP\_2}$ have the same frequency and opposite phase.

Figure 9:
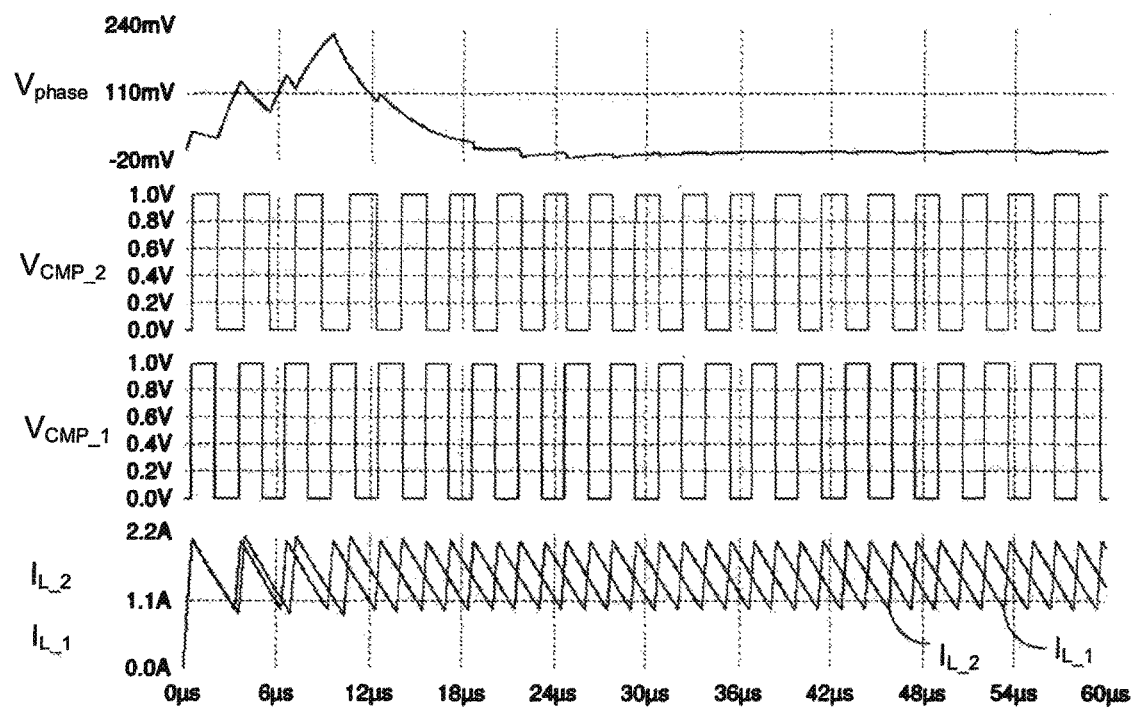
FIG. 9 shows results of simulation of the apparatus of FIG. 1, implemented using two median power converters with artificial hysteresis (FIG. 5) and the dual D-flip-flop-based control circuit of FIG. 8.

FIG. 9 shows the results of a simulation of an embodiment of the apparatus 2 of FIG. 1, in which the hysteretic power converters 3, 4, are each implemented by a median power converter 110 (FIG. 5), and in which the control circuit 5 is implemented by the control circuit 300 (FIG. 8) based on a dual D-flip-flop. It can be seen that, within a few cycles of operation, the first and second power converters 3, 4, are operating in steady state with opposite phases and equal frequencies. This is achieved for all duty-cycles.

FIG. 10 illustrates a control circuit 400 based on phase detection by an exclusive-OR (XOR) gate. This control circuit 400 is suitable for use as the control circuit 5 of FIG. 1, when using the median converter 110 of FIG. 5 for each of the hysteretic power converters 3, 4 of FIG. 1. The XOR phase detector does not work with the hysteretic converter with real hysteresis of FIG. 2.

The control circuit 400 includes an XOR gate 416 which receives the first and second current comparator output signals $V_{CMP\_1}$ and $V_{CMP\_2}$, from the first and second power converters 3, 4 respectively, at its inputs. The output of the XOR gate 416 drives a first switched current source 420. The output of the XOR gate 416 is also inverted by an inverter 418, with the output of the inverter 418 driving a second switched current source 422. The current sources 420, 422 are connected in parallel in opposite senses, such that the non-inverted output of the XOR gate 416 drives the 'down' current source 420, while the inverted output of the latch 416 drives the 'up' current source 422. A filter is connected in parallel with the current sources 420, 422 and comprises a capacitor 424 and a resistor 426. A control voltage $V_{phase}$ is developed across the capacitor 424, which is used to control the hysteresis of the second hysteretic power converter 4. This phase detector based on an XOR has the potential drawback that it has a 90 degree phase shift between its inputs for zero output.

Figure 11:
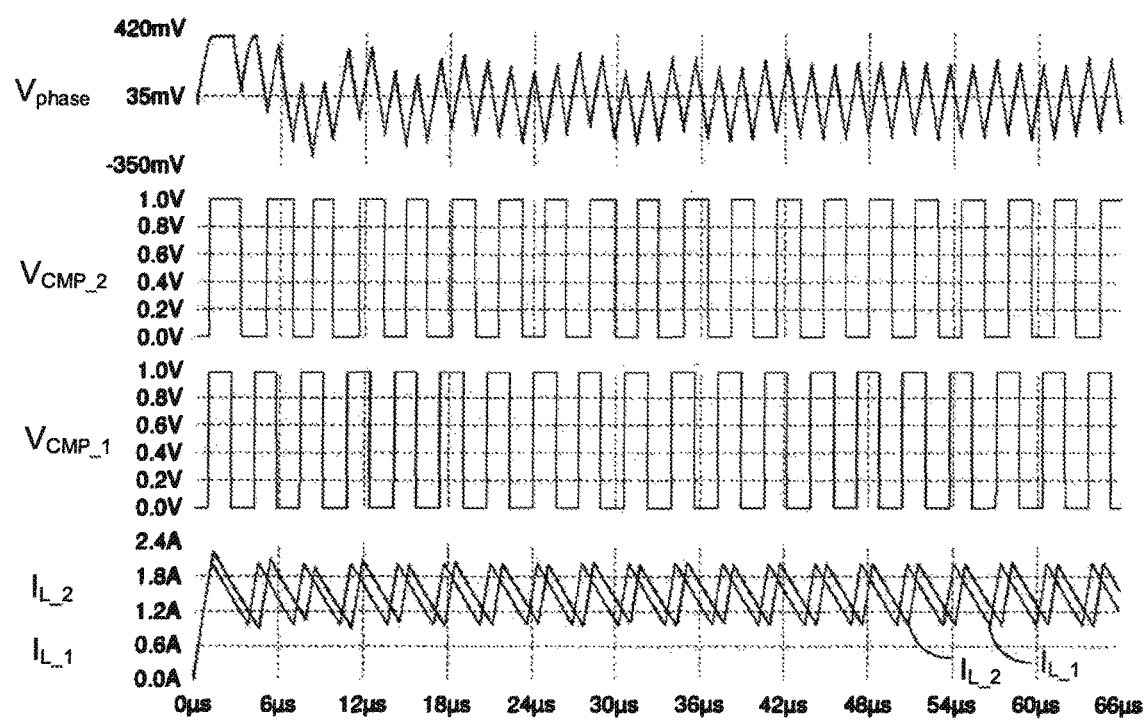
FIG. 11 shows results of simulation of the apparatus of FIG. 1, implemented using two median power converters with artificial hysteresis (FIG. 5) and the XOR-based control circuit of FIG. 10.

FIG. 11 shows the results of a simulation of an embodiment of the apparatus 2 of FIG. 1, in which the hysteretic power converters 3, 4, are each implemented by a median power converter 110 (FIG. 5), and in which the control circuit 5 is implemented by the control circuit 400 (FIG. 10) based on a XOR gate. It can be seen that, within a few cycles of operation, the first and second power converters 3, 4, have 90 degree phase shift and equal frequencies. This is achieved for all duty-cycles.

Figure 12:
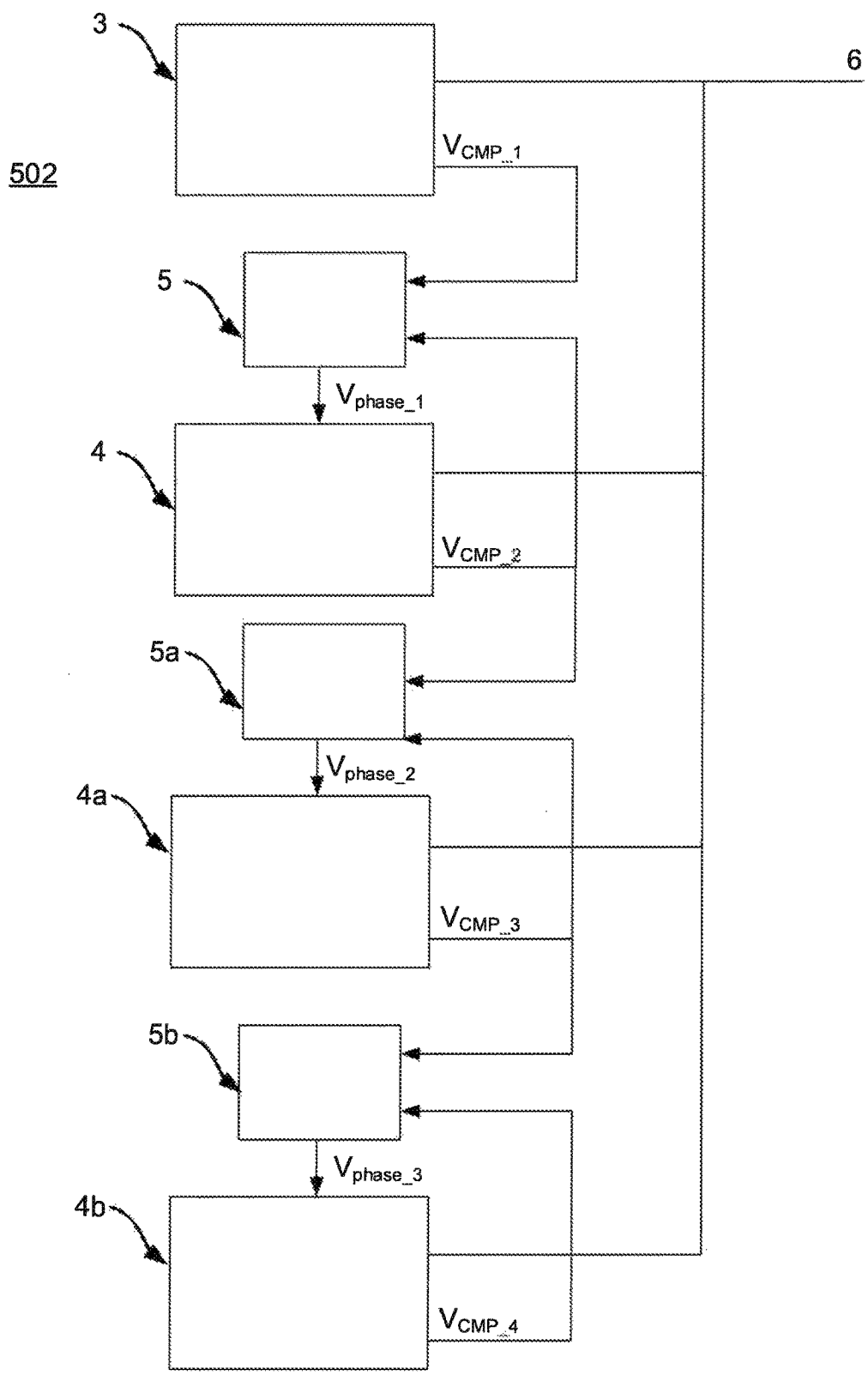
FIG. 12 illustrates the apparatus of the present invention according to another embodiment.

FIG. 12 illustrates an apparatus 502 according to a further embodiment of the present invention. The apparatus 502 comprises four hysteretic power converters 3, 4, 4a, 4b, in multi-phase configuration, and three control circuits 5, 5a, 5b. The control circuits 5, 5a, 5b may each be implemented using the control circuit 400 based on the XOR phase detector as described above with reference to FIG. 10, for achieving a 90 degrees phase difference between each pair of hysteretic power converters 3, 4, 4a, 4b. The first control circuit 5 is configured to output a first control signal $V_{phase\_1}$ dependent on a phase difference or frequency difference between the first and second hysteretic power converters 3, 4, for controlling the hysteresis of the second hysteretic power converter 4. The second control circuit 5a is configured to output a second control signal $V_{phase\_2}$ dependent on a phase difference or frequency difference between the second and third hysteretic power converters 4, 4a, for controlling the hysteresis of the third hysteretic power converter 4a. The third control circuit 5c is configured to output a third control signal $V_{phase\_3}$ dependent on a phase difference or frequency difference between the third and fourth hysteretic power converters 4a, 4b, for controlling the hysteresis of the fourth hysteretic power converter 4b. The hysteretic power converters 3, 4, 4a, 4b may be implemented using median converters as described above with reference to FIG. 5.

Three embodiments 200, 300, 400 of the control circuit 5 have been described above, each incorporating a different type of phase detector for detecting a phase difference or frequency difference between the hysteretic power converters 3, 4. However, the skilled person will appreciate that many other types of phase detector exist, suitable for implementation of the present invention.

Although particular embodiments of the invention have been described above, it will be appreciated than many modifications, including additions and/or substitutions, may be made within the scope of the appended claims.

The invention claimed is:

1. An apparatus comprising:
a first power converter with real or artificial hysteresis;
a second power converter with real or artificial hysteresis; and
a control circuit configured to output a control signal dependent on a phase difference or frequency difference between the first and second power converters;
wherein the apparatus is configured such that a magnitude of hysteresis of at least one of said first and second power converters is controlled by said control signal.

2. An apparatus according to claim 1, wherein at least one of said first/second power converters comprises a first/second current comparator with hysteresis, configured to generate a first/second current comparator output signal based on a comparison of a current flowing in a first/second inductive element of the first/second power converter and upper and lower first/second reference current levels.

3. An apparatus according to claim 2, configured such that the magnitude of hysteresis of at least one of said first and second power converters is controlled by adjusting said upper and/or lower first/second reference current levels based on said control signal.

4. An apparatus according to claim 1, wherein at least one of said first/second power converters comprises a median power converter comprising a first/second current comparator with no hysteresis, configured to generate a first/second current comparator output signal based on a comparison of a current flowing in a first/second inductive element of the first/second power converter and a first/second reference current level.

5. An apparatus according to claim 4, configured such that the magnitude of hysteresis of at least one of said first and second power converters is controlled by adjusting at least one time delay for delaying switching of the first/second power converter relative to the first/second current comparator output signal based on said control signal.

6. An apparatus according to claim 1, wherein:
said first power converter comprises a first current comparator configured to generate a first current comparator output signal based on a comparison of a current flowing in a first inductive element of the first power converter and at least one first reference current level;
said second power converter comprises a second current comparator configured to generate a second current comparator output signal based on a comparison of a current flowing in a second inductive element of the second power converter and at least one second reference current level; and
said control circuit is configured to output said control signal dependent on a phase difference or frequency difference between the first current comparator output signal and the second current comparator output signal.

7. An apparatus according to claim 1, wherein the apparatus operates in steady state when the first and second power converters are operating at the same frequency.

8. An apparatus according to claim 1, wherein the apparatus is configured to operate in steady state when the first and second power converters are operating at the same frequency and opposite phase.

9. An apparatus according to claim 1, wherein the apparatus is configured to operate in steady state when the first and second power converters are operating at the same frequency and 90 degree relative phase shift.

10. An apparatus according to claim 1, further comprising:
a third power converter with real or artificial hysteresis;
a fourth power converter with real or artificial hysteresis:
a second control circuit configured to output a second control signal dependent on a phase difference or frequency difference between the second and third power converters, wherein the hysteresis of at least one of said second and third power converters is controlled by said second control signal; and
a third control circuit configured to output a third control signal dependent on a phase difference or frequency difference between the third and fourth power converters, wherein the hysteresis of at least one of said third and fourth power converters is controlled by said third control signal.

11. An apparatus according to claim 1, wherein the control circuit comprises a phase/frequency detector comprising at least one of the following: dual D-flip-flops, an SR flip-flop, and/or an XOR-gate for determination of said phase/frequency difference.

12. An apparatus according to claim 1, wherein the control circuit comprises a filter comprising a capacitor, wherein the control circuit further comprises first and second switched current sources arranged to charge and discharge the capacitor respectively.

13. An apparatus according to claim 12, wherein said control signal corresponds to a voltage across said filter.

14. An apparatus according to claim 1, further comprising a power output coupled to said first and second power converters.

15. A power supply for an LED array, comprising an apparatus according to claim 1.

* * * * *